CIRCUIT BREAKER FOR HIGH VOLTAGE DIRECT CURRENT

Original Filed June 1, 1971

INVENTOR.
WALTER PUCHER
BY
Jennings Bailey, Jr.

United States Patent Office

Re. 27,919
Reissued Feb. 12, 1974

27,919

CIRCUIT BREAKER FOR HIGH VOLTAGE DIRECT CURRENT

Walter Pucher, Vasteras, Sweden, by Allmanna Svenska Elektriska Aktiebolaget, Vasteras, Sweden, assignee Original No. 3,678,335, dated July 18, 1972, Ser. No. 148,711, June 1, 1971. Application for reissue Apr. 19, 1973, Ser. No. 352,718
Claims priority, application Sweden, June 15, 1970, 8,258/70
Int. Cl. H02h *3/00, 7/10*
U.S. Cl. 317—11 A 4 Claims

Matter enclosed in heavy brackets [ ] appears in the original patent but forms no part of this reissue specification; matter printed in italics indicates the additions made by reissue.

ABSTRACT OF THE DISCLOSURE

In a switching device for HVDC comprising two series-connected breaker units, the operating release of the device comprises a time delay means controlled by the voltage of the HVDC network. When breaking at voltages above a certain level, one of the breaker units opens a predetermined time before the other one, thus reducing the switching over-voltage. Below said level, however, the breaker units open simultaneously.

Figure 1:
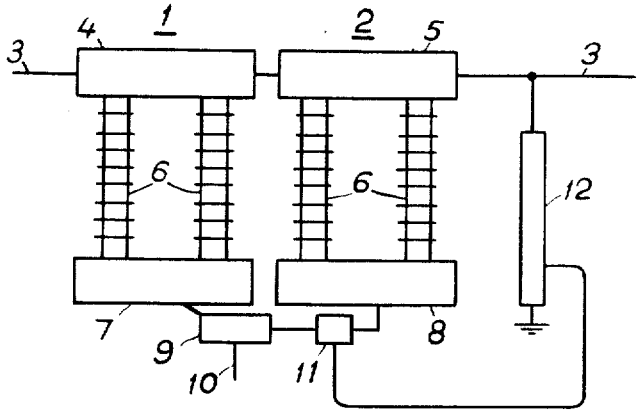

The present invention relates to an electric switching device for switching in and out of a line in a high voltage direct current network. The device includes at least two series-connected breaker units of the type producing a counter-voltage, which may either be combined in a single apparatus or comprise two separate circuit breakers.

The type of DC network for which the switching device is primarily intended consists of a rectifier station and an inverter station connected by a DC power transmission line which usually consists of a plurality of a parallel conductors. Such a transmission line is normally controlled according to the current marginal principle which means that both the rectifier station and the inverter station are provided with a current regulator to set a certain current value in each station. These current values are selected so that the current setting of the rectifier sattion exceeds the current setting of the inverter station by a certain quantity, the so-called current marginal. In a transmission system controlled in this way the current tapped at a fault location on the line can never be greater than said marginal current. If the current through the fault point should tend to become greater, the inverter would receive less current than it is set for which means that its voltage is reduced. The rectifier will then also reduce its voltage to prevent its current exceeding the set value. The two stations are then controlled so that their voltage is greatly decreased and thus also the voltage on the line. A stable value is obtained when the voltage at the fault location reaches a value determined by the marginal current times the earth resistance. A moderate values of the earth resistance therefore, the voltage at the fault location will be very low, and so will the voltage in the converter stations.

DC circuit breakers of the type producing a counter-voltage, produce a voltage during breaking which is opposite to the voltage drop driving the current through the line. The voltage of the breaker must be greater than the driving voltage in order to be able to decrease the current to zero, and the higher the voltage of the circuit breaker is, the earlier this object is reached. However, an upper limit is set by the insulation level of the DC network which in plants built and planned so far corresponds to a maximum permitted over voltage factor of 1.5 to 2.0.

With breaking normal service current, all parts of the network are at high potential, which is approximately equal to the rated service voltage U, whereas the driving voltage is 0.1 to 0.2U. For a breaking operation to succeed, therefore, a breaking voltage is required which is greater than 0.1 to 0.2U and, in view of the insulation level, it must be less than 0.5 to 1.0U.

On the occasion of a short-circuit breaking, however, the network voltage is low (substantially equal to zero) since, as described above, it is limited by the converters. A considerably higher breaking voltage may therefore be permitted than for service current breaking, and a quicker breaking action is achieved. Even in plants where the voltage and current of the converters are not limited in the manner described above, the network voltage during the first stage of a short-circuit will be relatively low since a relative large amount of the total voltage is taken up by the smoothing reactors of the rectifier station. Contrary to the network voltage, however, the driving voltage is high (approximately equal to U), and so is the breaking current. In order to be able to break under these conditions the voltage of the breaker must be greater than U and with respect to the maximum permitted over voltage factor, less than 1.5 to 2.0U.

As can be seen from the above, completely different dimands are made on the switching device in the two breaking cases, service current breaking and short-circuit breaking. In order to meet these demands it is proposed according to the invention that a switching device of the type mentioned in the first part of the description, which comprises two electrically series-connected breaker units, is designed so that one of the breaker units can, by means of a voltage-controlled time-delay device, be given a prolonged opening time, the voltage control being obtained from a voltage-sensitive member, for example a voltage divider, which maintains the delay when the line is at high potential (corresponding substantially to rated service voltage U) and remove the delay when the line potential has dropped close to zero.

Figure 2:
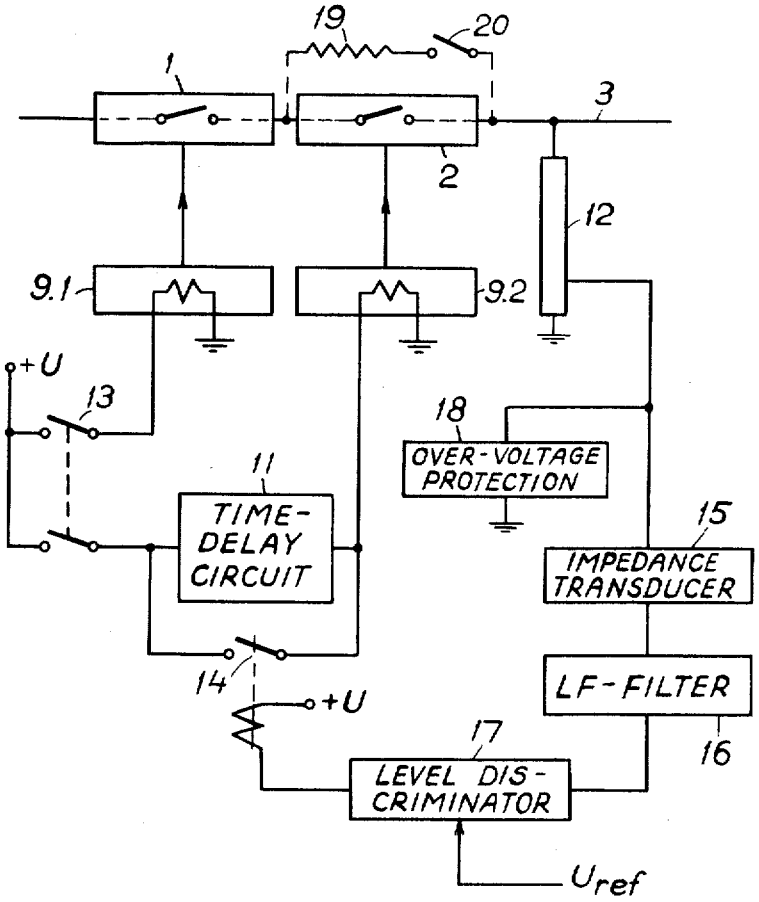

The invention will be further described in connection with the accompanying drawing, in which FIG. 1 shows how a switching device according to the invention is constructed in principle, whereas FIG. 2 shows a more detailed example of how the release system of the switching device may be constructed.

The switching device shown in FIG. 1 consists of two series-connected breaker units 1 and 2 which are connected in a power transmission line 3 for high voltage direct current. Each breaker unit consists of a breaker element 4, 5, respectively, having one or more breaking contacts which may possibly be parallel connected with resistors and capacitors for voltage control and energy dissipation. The breaking contacts may, for example, be of the type described in U.S. Pat. No. 3,542,985, but any suitable construction of the type producing a counter voltage may be used. The breaking elements 4 and 5 are supported by support isolators 6, at the lower ends of which operating devices 7 and 8 are arranged. The connection between the operating devices 7 and 8 and the breaking elements 4 and 5 is placed inside the support insulators 6. A release device 9 is arranged to release the switching device when a release impulse is supplied through a conductor 10, for example from a relay protection means connected to the DC line 3. Between the release device 9 and the operating device 8 of the breaker unit 2 is a time-delay device 11 which is controlled from a voltage divider 12 connected to the line 3. This voltage divider may either be arranged separately or be built in to the switching device. If the plant is provided with relay protection means in which a corresponding voltage divider or some other voltage-sensitive member is included, the necessary voltage signal to the time-delay device 11 may in certain cases be obtained from this member so that no special voltage divider in direct connection with the switching device is required. The time delay device 11 may consist of passive circuits (for example a time delay line of RC type) or active members, for example a relay with delayed closing action. It is also possible to effect the delay by means of electrically controlled, pneumatic or hydraulic members. This may be particularly suitable if the switching device is operated by means of pressurized gas or hydraulic medium.

The switching device shown operates in the following manner: When the release device 9 obtains a release impulse during normal operation of the DC network, after a relatively short opening time, the breaker unit 1 will itself take care of breaking the service current, the breaker unit 2 being still closed. The switching device thus generates a counter voltage which does not exceed 0.5 to 1.0U. When the breaking process has been completed, the breaker unit 2 opens after a predetermined time delay, and thus ensures full insulation over the open switching device. When short-circuit currents are being broken, the DC line is almost voltageless and the time delay to the breaker unit 2 ceases. In this case, the breaker units 1 and 2 open simultaneously and together built up the required counter-voltage (less than 1.5 to 2.0U).

If desired, the signal from the voltage divider 7 may be used not only to cancel the delay in the time-delay device 11 but also be led directly to the release device 9 and used to directly release the switching device when the voltage on the DC line drops below a certain level, for example upon a short-circuit. Such an arrangement may be used with advantage, for example when the DC network is so relatively simply constructed that a relay protection means for selective release of different breakers is not required.

In the embodiment according to FIG. 2, the breaker units 1 and 2 are provided with release devices 9.1 and 9.2, respectively, and the time delay means 11 is connected in series with the release device 9.2 The two release devices 9.1 and 9.2 are activated from an operating voltage source +U via contact members 13 which are operated by a coil, not shown, in a protective relay. The release may also be effected manually by means of a push-button switch, not shown, which is connected in parallel with the contact members 13. The time delay device 11 may be by-pass connected with the help of a relay 14 which is controlled from the voltage divider 12 via an impedance transducer 15, a low frequency filter 16 and a level discriminator 17 (threshold indicator, i.e. Schmitt trigger). In order to protect the electronic equipment from high transient voltages, an over-voltage protection device 18 is provided.

The impedance transducer 15 consists of a member having high impedance, for example a transistorized emitter-follower. This prevents the equipment connected to the voltage divider 12 from loading the voltage divider to any great extent. The low frequency filter 16 has the task of suppressing disturbances and high frequency transients so that substantially only the direct voltage component with low frequency voltage alterations is allowed through to the level discriminator 17. In the level discriminator 17, the network voltage measured by the voltage divider is compared with a threshold value, which can be set by means of a reference voltage $U_{ref}$. If the network voltage is greater than said threshold value, the relay 14 is not affected. This means that when the switching device receives a release signal, the breaker unit 1 will be released first while the release of the breaker unit 2 is delayed a certain time, for example 20–30 milliseconds. If, on the other hand, the network voltage is less than said threshold value, the level discriminator 17 will assume a new position so that the relay 14 closes and by-pass connects the time delay device 11. When upon a release signal, the contact member 13 is closed in this case, the release of both the breaker units will take place simultaneously.

A DC switching device of the type in question is preferably intended for so-called commutation breaking in a power transmission line having a plurality of parallel conductors. However, if for some reason it is desired to break the operating current in the transmission line after all parallel lines except one have been taken out of operation, the switching device may also be used for this purpose, provided that the time delay of the breaker unit 2 is made inoperative. Such a breaking action is considerably more difficult than a commutating breaking action and may only be permitted if the converter equipment is provided with protective devices or is controlled in such a way that the insulation level of the plant is not exceeded.

With the proposed switching means it is also easy to prevent impermissible over-voltages from arising when a high voltage DC line is being connected. For this purpose a switching-in resistor 19 in series with a contact device 20 may be connected in parallel with the breaker unit 2. The DC line is then connected so that the breaker unit 1 and said contact 20 are closed first and the line connected in series with the resistor. After a certain time delay, the breaker unit 2 closes and short-circuits the resistor, after which the contact device 20 in series with the resistor is opened. This contact device is thus closed for only a short time in connection with the closing operation. Since the contact device 20 is in series with the breaker unit 1, its insulating strength over the open contacts need only correspond to the value necessary for the breaker unit 2. The contact device does not need any breaking capacity, furthermore, and can therefore be made relatively simple.

The operating devices 7, 8 and time delay device 11 need not be placed at earth potential as shown in the drawing, but may instead be arranged in direct connection with the breaking elements 4, 5 at high potential. Furthermore, the two breaker units do not need to be exactly similar. They may, for example, contain a different number of series-connected breaking contacts.

I claim:

1. Electric switching device for a high voltage direct current line (3), said device comprising at least two series-connected breaker units of the type producing a counter voltage, in which the release circuit of the switching device comprises a voltage-controlled time delay means (11) which by means of a voltage-sensitive member is arranged to be influenced by the potential of the line in such a way that when breaking at voltages above a certain level one of the breaker units opens before the other one and is thus solely responsible for breaking the current, whereas at voltages below said level, both the breaker units open simultaneously.

2. Switching device according to claim 1, in which each of said breaker units consists of a separate circuit breaker.

3. Switching device according to claim 1, in which the release circuit is arranged to be directly influenced by the voltage-sensitive member in such a way that the switching device is automatically released if the potential on the DC line drops below a certain level.

4. Switching device according to claim 1, in which one of the breaker units is arranged to close later than the other breaker unit, a switching in resistor being connected in series with a contact device parallel to the later closing breaker unit, said contact device being closed only during a switching-in operation of the DC line.

(References on following page)

References Cited

The following references, cited by the Examiner, are of record in the patented file of this patent or the original patent.

UNITED STATES PATENTS

| | | | |
|---|---|---|---|
| 3,564,336 | 2/1971 | Buergi | 317—11 C |
| 3,287,531 | 11/1966 | Yonezawa | 200—144 AP |

J. D. MILLER, Primary Examiner

H. FENDELMAN, Assistant Examiner

U.S. Cl. X.R.

317—11 B, 11 C, 11 E, 31, 38; 307—136, 141.8